(12) United States Patent
Hendrickson et al.

(10) Patent No.: US 9,904,029 B1
(45) Date of Patent: Feb. 27, 2018

(54) CURBSIDE OPTICAL FIBER CABLE INSTALLATIONS

(71) Applicant: OFS Fitel, LLC, Norcross, GA (US)

(72) Inventors: Daniel Hendrickson, Roswell, GA (US); Daryl K Richardson, Flowery Branch, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/348,133

(22) Filed: Nov. 10, 2016

(51) Int. Cl.
| | |
|---|---|
| *G02B 6/00* | (2006.01) |
| *G02B 6/44* | (2006.01) |
| *G02B 6/46* | (2006.01) |
| *G02B 6/48* | (2006.01) |

(52) U.S. Cl.
CPC ............ *G02B 6/46* (2013.01); *G02B 6/443* (2013.01); *G02B 6/483* (2013.01)

(58) Field of Classification Search
CPC .... G02B 6/443; G02B 6/4407; G02B 6/4432; G02B 6/4457; G02B 6/4463; G02B 6/4495; G02B 6/46; G02B 6/483; E01F 9/041; E01F 9/042; E01F 9/081; E02F 5/10
USPC ........... 385/100–114, 134–139; 156/71, 166, 156/433, 441, 523, 579
See application file for complete search history.

(56) References Cited

U.S. PATENT DOCUMENTS

| | | | |
|---|---|---|---|
| 7,548,680 B2 | 6/2009 | Castonguay et al. | |
| 8,162,546 B1 | 4/2012 | Mumm et al. | |
| 8,355,613 B2 | 1/2013 | Weimann | |
| 8,517,344 B2 | 8/2013 | Hammons | |
| 8,727,319 B2 | 5/2014 | Hammons | |
| 9,459,421 B2 | 10/2016 | Gibbs et al. | |
| 9,588,315 B1* | 3/2017 | Turner | G02B 6/46 |
| 2004/0134169 A1* | 7/2004 | Persson | A01K 13/007 54/82 |
| 2004/0234215 A1 | 11/2004 | Serrano et al. | |
| 2013/0020015 A1 | 1/2013 | Dickinson et al. | |
| 2013/0312152 A1* | 11/2013 | Paul | A41D 13/015 2/16 |
| 2014/0133808 A1* | 5/2014 | Hill | G02B 6/3826 385/81 |
| 2015/0030296 A1* | 1/2015 | Sakabe | G02B 6/4495 385/114 |
| 2016/0202436 A1* | 7/2016 | Rossiter | G02B 6/3887 385/102 |

(Continued)

FOREIGN PATENT DOCUMENTS

EP  1 903 362 A1  3/2008

*Primary Examiner* — Akm Enayet Ullah
*Assistant Examiner* — Michael Mooney
(74) *Attorney, Agent, or Firm* — Wendy W. Koba, Esq.

(57) ABSTRACT

An above-ground optical fiber cable installation consists of an optical fiber cable that is laid along an edge of a street (such as along a curb), and then covered with an adhesive overcoat material, such as a fast-curing epoxy and/or concrete repair/resurface compounds. The adhesive overcoat initially functions to affix the optical fiber cable to the street, and as it cures provides a protective encapsulation for the installed cable. The hard shell prevents exposure of the optical fiber cable to the environment and reduces the potential for damage from equipment that might otherwise cut through the cable. This type of cable installation is useful for situations that require rapid deployment, and avoids the need for creating either underground or aerial pathways.

16 Claims, 3 Drawing Sheets

(56) References Cited

U.S. PATENT DOCUMENTS

2016/0216472 A1 7/2016 Ott

* cited by examiner

CURBSIDE OPTICAL FIBER CABLE INSTALLATIONS

TECHNICAL FIELD

The present inventions relates to a system and method for optical fiber cable installation and, more particularly, to a system and method particularly well-suited for rapid deployment of an outside plant installation.

BACKGROUND OF THE INVENTION

Various local organizations (cities, municipalities, etc.) are increasingly having optical fiber cable systems installed for purposes of providing access to high speed wireless internet services, as well as to enable continuous and comprehensive surveillance for traffic safety and personal security. Common configurations utilized for such optical fiber cable installations have conventionally utilized either aerial (i.e., pole-mounted) or underground arrangements. A typical underground cable installation requires the digging of a trench (typically in an existing street or pedestrian surface), laying conduit, and then running one or more optical fiber cables through the conduit. Alternative installation methods are known to include underground boring and micro-trenching (for creating conduit paths or directly burying the cable itself). All of the aforementioned practices are labor-intensive, time-consuming, and disruptive to vehicular and pedestrian traffic. Moreover, underground cable installations tend to be prone to subsidence and/or undesirable surface irregularities after the conduit and cable are laid and the trench is refilled.

Thus, a need remains for an improved system for installing outdoor (typically referred to as "outside plant") optical fiber cable, particularly is situations where pole-mounted access is not available.

SUMMARY OF THE INVENTION

The need remaining in the art is addressed by the present invention, which relates to a system and method for optical fiber cable installation and, more particularly, to an above-ground optical fiber cable system and method particularly well-suited for rapid deployment of outside plant installations, such as bringing fiber to a brown field site.

In accordance with at least one exemplary embodiment of the present invention, an optical fiber cable is laid along an edge of a street (such as along a curb) and covered with an adhesive overcoat material, such as a fast-curing epoxy and/or concrete repair/resurface compounds. The adhesive overcoat initially functions to affix the optical fiber cable to the street, and as it cures provides a protective encapsulation for the installed cable. The hard shell prevents exposure of the optical fiber cable to the environment and reduces the potential for damage from equipment that might otherwise cut through the cable.

In one exemplary embodiment, a single layer of an adhesive overcoat material may be used, and takes the form of a "hard flexible shell" (HFS) overcoat that bonds the optical fiber cable to a curb and hardens in place around the cable.

In an alternative embodiment, a multi-layer coating may be utilized, which is particularly well-suited for harsher environmental conditions. In one multi-layer embodiment, a first coating layer of a relatively low density material is applied to the optical fiber cable and then least one layer of a higher density coating material is applied as an adhesive overcoat to create the final structure. The inner layer functions as a cushion to absorb some of the mechanical and physical stresses/changes imparted to the overcoat, minimizing the stresses experienced by the encased optical fiber cable itself.

In one embodiment, the optical fiber cable is deployed along an inner corner of a curb formed at a street edge boundary, with the sidewalls of the curbing functioning as additional protective features to which the adhesive overcoat may be affixed. Alternatively, encased optical fiber cable of the present invention may also be installed along a top surface of a curb, a lower surface of a curb, or any other street-level location where the cable is unobtrusive, yet easily accessible by technicians when required for repair or replacement.

An exemplary embodiment of the present invention takes the form of an above-ground optical fiber cable installation comprising an optical fiber cable deployed along a predetermined above-ground pathway from an initial termination location to a final termination location, and an adhesive overcoat disposed over the extent of the optical fiber cable from the initial termination location to the final termination location. The adhesive overcoat is formed of a material that is initially viscous so as to adhere to the pathway, and then cures into a hardened shell to encase the deployed optical fiber cable.

Another embodiment of the present invention relates to method of deploying an above-ground optical fiber cable installation including the steps of: deploying a length of optical fiber cable along a predetermined above-ground pathway from an initial termination location to a final termination location, and dispensing an adhesive overcoat material along the length of the optical fiber cable in an amount sufficient to encase the optical fiber cable and affix the optical fiber cable in position along the pathway, the adhesive overcoat comprising a material that hardens upon curing.

Other and further aspects and embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

As mentioned above, the optical fiber cable system of the present invention provides a solution that speeds cable installation in many outside plant situations. For example, brown field developments often desire the ability to quickly and easily bring a high speed network into an area that has little or no other means of communication access. The ability to lay cable across an exposed surface (referred to variously as "above-ground" or "curbside") is considerably less time-consuming, as well as less labor-intensive and expensive, than the conventional underground cable installation process. As mentioned above, a typical underground cable installation process typically involves digging a trench, laying conduit within the trench and installing the cable through the conduit.

While repair risks are higher with the above-ground optical fiber cable system of the present invention (when compared to conventional underground systems), the increase in deployment speed will typically outweigh these risks. Moreover, the number of people required to perform the installation of the inventive above-ground system is significantly reduced when compared to underground installations, and the utilization of an above-ground system obviously results in minimal disruption to the surrounding area.

Figure 1:
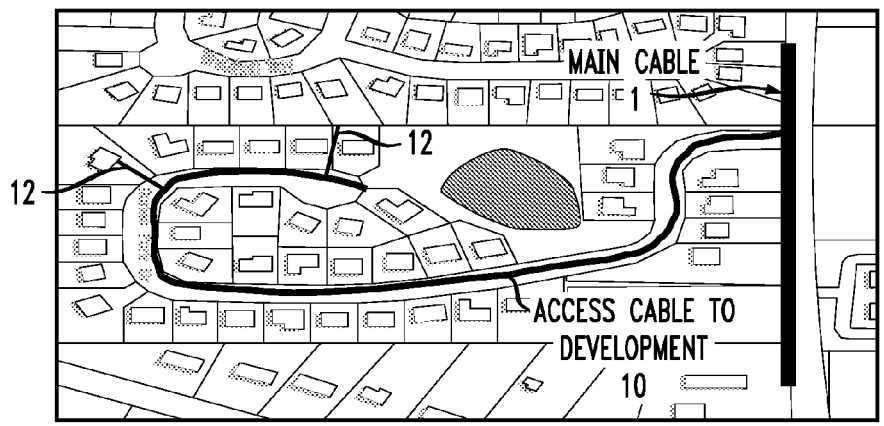
FIG. 1 illustrates an exemplary location for an above-ground optical fiber cable installation in accordance with the present invention.

FIG. 1 is an overhead view of a typical brown field location where an above-ground optical fiber cable system of the present invention may be installed. In this case, an existing (underground) optical fiber cable 1 is shown as running along an existing highway, and can be used for providing access to a new route. In accordance with the present invention, an above-ground optical fiber access cable 10 is coupled to main cable 1 (in a known manner) to provide optical communication services in a new area.

In a preferred embodiment of the present invention, access cable 10 comprises a relatively small outer diameter (e.g., an OD on the order of about 10 mm or less) so as to aid in maintaining an unobtrusive, low-profile attachment to an existing street surface. However, it is to be understood that the above-ground optical fiber cable system of the present invention is not limited to this particular cable diameter and, in fact, optical fiber cables of any known diameter can indeed be installed in an above-ground deployment in accordance with the present invention. Additionally, while the installation system of the present invention refers to the installation of an "optical fiber cable", it is to be understood that the term "cable" includes various groupings of optical fibers as deployed in various situations. For example, a "micro-conduit" is one type of smaller-sized cabling that may be utilized in residential or brown field installations. Thus, the term "optical cable" (or, variously, "access cable" or "access optical cable") is considered to define all types of relevant fiber installations.

In the particular example as shown in FIG. 1, access cable 10 is deployed along a street within the brown field area, and is disposed along an edge of the street (preferably against curbing). More broadly, an above-ground optical fiber cable installation in accordance with the present invention consists of an optical fiber cable that is routed along a defined pathway and adhered to a portion of the pathway with a material that is able to create a sufficiently strong bond between the cable and the path, while also forming a reasonably hard protective overcoat for the cable.

Access cable 10 is periodically looped into lot easements where closures, hand holes, pedestals, poles, or other types of "drop points" are located. These various types of drop points (or drop locations) are common within the industry. Individual drop cables 12, as shown in FIG. 1, are located at various ones of these drop points and tied into access cable 10 in a conventional manner.

Figure 2:
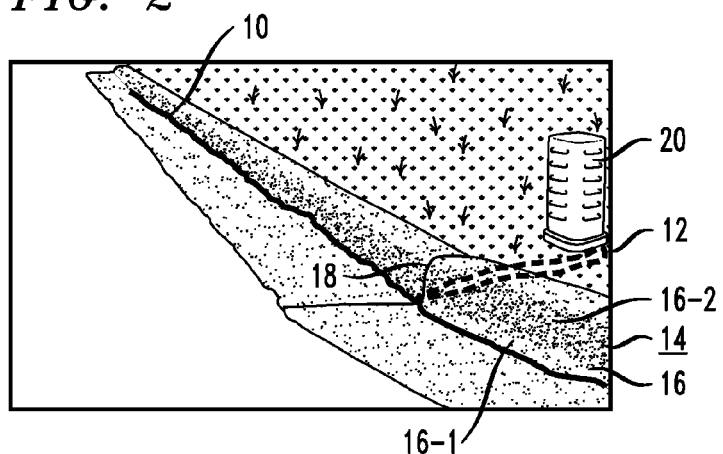
FIG. 2 is a depiction of a portion of the above-ground optical fiber cable installation as shown in FIG. 1, in this case particularly illustrating the placement of the optical fiber access cable along street side curbing, and also showing a drop cable location.

FIG. 2 illustrates the details of access cable 10 and an exemplary drop cable 12, where the positioning of access cable 10 along a section of street curbing 14 is evident in this view. In this preferred embodiment, access cable 10 is disposed along an inside corner 16 of curbing 14, where inside corner 16 serves to provide substantially orthogonal contact surfaces (shown as sidewalls 16-1 and 16-2) for securing access cable 10 in place. As will be discussed below, other locations for access cable 10 may be used. Indeed, the above-ground optical fiber cable installation of the present invention requires only the designation of a given pathway along which the optical fiber cable is to be laid, and may take the form of an edge of a paved road, a shoulder area of a road, or any other suitable location. In these latter circumstances, the ability to provide an unobtrusive cable installation may be preferred, including the use of a relatively small OD optical fiber cable.

In one exemplary deployment, curbing 14 may itself be cut at various defined locations to allow for relatively easy tie-in of the drop cables to the optical fiber access cable. FIG. 2 shows a slit cut 18 as made in curbing 14 so as to allow for a specific drop cable 12 to be placed. An exemplary pedestal drop device 20 is also shown at this location and is connected to drop cable 12.

Figure 3:
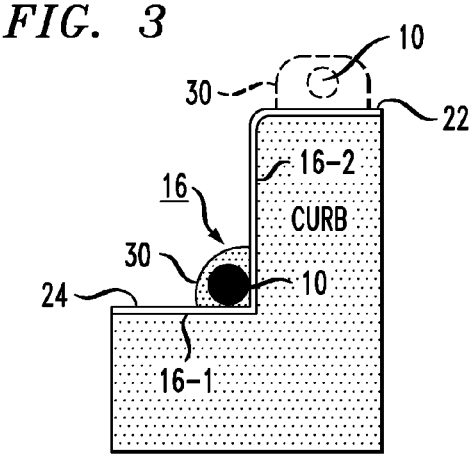
FIG. 3 is a cut-away side view of an exemplary above-ground optical fiber cable installation formed in accordance with the present invention, illustrating the placement of the optical fiber cable within the inner corner of curbing, and an adhesive overcoat encasing the cable and affixing it in place along the curbing.

FIG. 3 is a cut-away side view of an exemplary deployment of above-ground optical fiber access cable 10 in accordance with the present invention. As shown (and with additional reference to FIG. 2), optical fiber access cable 10 is shown as positioned along inner corner 16 of curbing 14. In accordance with the present invention, an adhesive overcoat material 30 (such as a fast-curing epoxy, bonding material, concrete resurface/repair material, or the like) is disposed to coat optical fiber access cable 10 in a manner such that cable 10 is affixed to inner corner 16 of curbing 14. As adhesive overcoat material 30 cures, it becomes relatively hard and thus functions as a rigid encasement for optical fiber cable 10. It is to be understood that the curing process does not impact the quality of the adhesion between the cable and the curbing (or other street location) itself. Preferably, the selected adhesive overcoat material cures in a manner to be relatively hard, yet maintains sufficient flexibility to allow for cable 10 to remain adhered to curbing 14 during fluctuations in environmental conditions (e.g., changes in temperature, humidity, etc.).

In the particular embodiment shown in FIG. 3, adhesive overcoat 30 is disposed so as to contact sidewalls 16-1 and 16-2 of inner corner 16. That is, upon initial application, the adhesive overcoat material is relatively liquid, and will naturally adhere to the surfaces of sidewalls 16-1 and 16-2, providing an interface between curbing 14 and optical fiber access cable 10. By using a sufficient amount of material to completely cover optical fiber access cable 10, the cable will be encased and protected once the overcoat material hardens.

While a preferred embodiment of the present invention may be to locate optical fiber access cable 10 within an inner corner 16 of curbing 14, it is also possible to position cable 10 at any other suitable "above ground" location, such as across a top surface 22 of curbing 14 or a lower portion 24 of curbing 14 (both locations shown in phantom in FIG. 3), with adhesive overcoat 30 utilized to adhere cable 10 to surface 22 or 24 (or any other suitable, unobtrusive location), as well as protect cable 10 from the elements. Indeed, as mentioned above, the above-ground optical fiber cable installation technique of the present invention is useful in providing a cable installation along any defined pathway, and does not require "curbing" in order to be accomplished.

It is clear that this type of quick deployment of a protected, above-ground optical fiber cable is able to easily bring an access cable into a new area (such as a brown field redevelopment) with minimal impact on the surrounding environment. The ability to provide such an installation without the need for a large crew to dig trenches, lay conduit and then place the cable in the conduit is considered to be a significant advantage that outweighs problems associated with cable damage.

Indeed, it is contemplated that if a section of above-ground optical fiber access cable 10 needs to be repaired or replaced, it is relatively easily to remove a portion of coating 30, remove the damaged portion of the cable, splice in a new cable section and apply a new coating of adhesive overcoat 30 to the repaired area. For example, a selected portion coating 30 may be removed by machine grinding, chemical dissolving, or any other conventional method well-known in the art.

Figure 4:
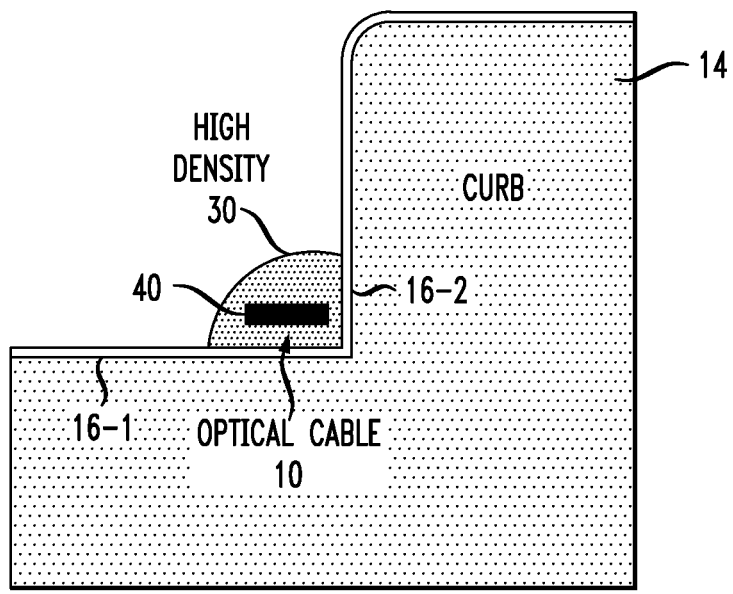
FIG. 4 illustrates an alternative configuration using the above-ground installation of the present invention, in this case in conjunction with deploying a "flat" ribbon optical fiber cable.

While the embodiment shown in FIGS. 2 and 3 contemplates the use of a round optical fiber cable, it is to be understood that cables of other geometries may also be utilized in the above-ground cable installation system of the present invention. FIG. 4 illustrates an exemplary above-ground cable installation utilizing a flat ribbon optical fiber cable 40. As with the above-described embodiment, ribbon cable 40 is positioned adjacent to inner corner 16 of curbing 14, with adhesive overcoat 30 shown as completely encasing flat ribbon cable 40 and also adhering cable 40 to walls 16-1 and 16-2 of inner corner 16.

Figure 5:
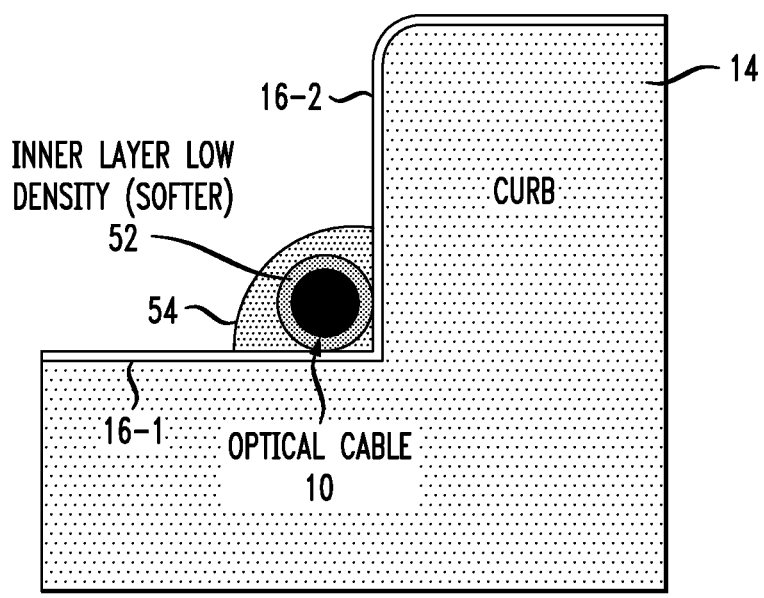
FIG. 5 illustrates another embodiment of the present invention, using a multi-layer adhesive overcoat structure to affix the optical fiber cable to a designated path location and provide additional cushioning for the cable in the presence of external fluctuations in physical surroundings.

As mentioned above, an alternative embodiment of the present invention utilizes a multi-layer coating structure to protect an above-ground cable deployment. Particularly advantageous in harsh environments where the cable may experience extreme temperature swings, mechanical stress, etc., it may be preferable to provide additional protection to the cable itself. A multi-layer coated above-ground optical fiber cable 50 formed in accordance with the present invention is shown in FIG. 5. Here, optical fiber access cable 10 is first coated with a protective layer 52 of a relatively low density (i.e., softer) material (such as, for example, any appropriate type of polyurethane joint sealant). An outer layer 54 is then formed around inner coating layer 52. As with the embodiments described above, outer layer 54 comprises an adhesive overcoat material (e.g., quick-drying epoxy, bonding compound, concrete repair/resurfacing material) that is capable of adhering (coated) cable 10 to the curbing and curing to a hard form for protecting the cable from damage. In this case, the presence of protective layer 52 functions to absorb a function of the stress experienced by the outer surface of the installed cable, protecting the encased access cable from damage or stress-related operational problems). Again, while the embodiment shown in FIG. 5 utilizes a round cable, it is to be understood that a multi-layer coated above-ground cable installation of the present invention may utilize a flat ribbon cable, or any other geometry of optical fiber cable.

Figure 6:
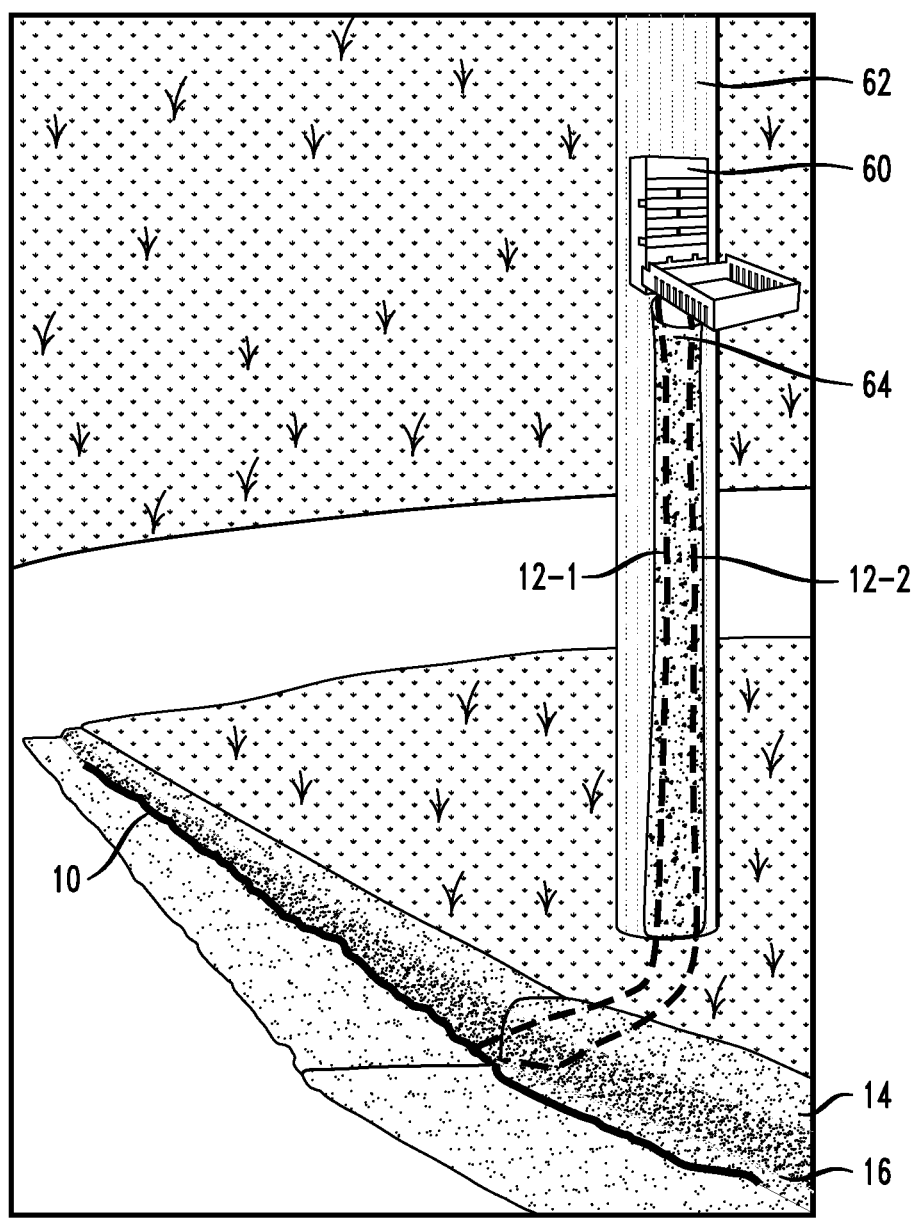
FIG. 6 shows an alternative type of installation, where the curbside optical fiber cable installation is extended upward along a pole (with adhesive coating utilized to affix the cable to the pole itself) for an aerial installation.

The above-described techniques for utilizing adhesive coatings for protecting above-ground cable installations can also be used to provide protection for various ones of the drop cables. FIG. 6 illustrates one exemplary illustration of this utilization. Similar to the configuration of FIG. 2, access cable 10 is deployed along inner corner 16 of curbing 14 (with cable 10 being protected with adhesive coating 30). In this example, a pair of drop cables 12-1 and 12-2 are taken from cable 10, passed through slit 18 in curbing 14 and ultimately spliced into a closure device 60 mounted on a pole 62. In accordance with the present invention, drop cables 12-1 12-2 are coated with an adhesive material 64 that functions to affix the drop cables to the pole and provide for a hard, flexible shell encasement for the drop cables. It is to be understood that the adhesive coating materials utilized for this purpose may differ from those appropriate for adhesion of access cable 10 (for example, based upon the differences between adhering to a concrete curb vs. a composite material pole structure). A quick-drying epoxy material may be appropriate for encasing both access cable 10 and drop cables 12.

It is to be understood that in any of these or other embodiments of the present invention, the optical fiber access cable itself may be formed to include one or more additional protective layers (for example, water-blocking layers, fire retardant layers, etc.) that are commonly incorporated within the cable itself.

It is contemplated that a variety of different methods may be utilized to perform the installation of the above-ground optical fiber cable of the present invention. Preferably, the area to which the cable is to be adhered is first cleaned to ensure proper attachment. In one specific method, the optical fiber cable may be laid first, and then the bonding material disposed to cover and encase the cable (while also adhering to adjacent portions of the street area). Alternatively, the bonding material may be applied first, with the cable then press-fit (for example) to be encased within the bonding material while it is still in a liquid state.

In situations where a multi-layer encasement is used, the cable may be first processed (either on-site or off-site) to be jacketed by an inner, low density coating. Thereafter, the jacketed cable is installed along the street (preferably a curbing) using any appropriate technique.

Those skilled in the art will appreciate that the present invention is not limited to any specifically-discussed application and that the embodiments described herein are illustrative and not restrictive. From the description of the exemplary embodiments, equivalents of the elements shown therein will suggest themselves to those skilled in the art, and ways of configuring other embodiments of the present invention will suggest themselves to these practitioners. Therefore, the scope of the present invention is to be limited only by the claims that follow.

What is claimed is:

1. An above-ground optical fiber cable installation comprising:
   an optical fiber cable deployed along an inner corner of curbing from an initial termination location to a final termination location; and
   an adhesive overcoat disposed over the extent of the optical fiber cable from the initial termination location to the final termination location, the adhesive overcoat comprising a material that is initially viscous so as to adhere to a pair of perpendicular sidewalls forming the inner corner of curbing and then curing into a hardened shell to encase the deployed optical fiber cable.

2. The above-ground optical fiber cable installation as defined in claim 1 wherein the adhesive overcoat comprises a single layer of material.

3. The above-ground optical fiber cable installation as defined in claim 2 wherein the adhesive overcoat comprises a material that cures into a hardened, flexible shell around the optical fiber cable.

4. The above-ground optical fiber cable installation as defined in claim 2 wherein adhesive overcoat material is selected from the group consisting of: quick-drying epoxy, quick-drying bonding compound, cement repair material, and cement resurfacing material.

5. The above-ground optical fiber cable installation as defined in claim 1 wherein the adhesive overcoat comprises multiple layers of material.

6. The above-ground optical fiber cable installation as defined in claim 5 wherein the multiple layers include an inner protective layer of low density material for cushioning the optical fiber cable and an outer layer of high density material that is initially viscous to adhere to the pair of perpendicular sidewalls of curbing and then curing into a hardened shell to encase the deployed optical fiber cable.

7. The above-ground optical fiber cable installation as defined in claim 1 wherein the optical fiber cable comprises an optical fiber cable that is round in diameter.

8. The above-ground optical fiber cable installation as defined in claim 7 wherein the optical fiber cable exhibits a relatively small outer diameter, less than about 10 mm.

9. The above-ground optical fiber cable installation as defined in claim 8 wherein the outer diameter of the optical fiber cable is less than about 5 mm.

10. The above-ground optical fiber cable installation as defined in claim 1 wherein the optical fiber cable comprises a flat ribbon optical fiber cable.

11. The above-ground optical fiber cable installation as defined in claim 1 wherein the optical fiber cable comprises an optical fiber micro-conduit cable.

12. An above-ground optical fiber cable installation comprising:
a pole-mounted drop device the optical fiber access cable
an optical fiber access cable deployed along a predetermined above-ground pathway from an initial termination location to a final termination location, the optical fiber access cable includes one or more drop cables deployed upward along an exposed surface of the pole and coupled to the pole-mounted drop device; and
an adhesive overcoat disposed over the extent of the optical fiber access cable from the initial termination location to the final termination location, the adhesive overcoat comprising a material that is initially viscous so as to adhere to the pathway and then curing into a hardened shell to encase the deployed optical fiber access cable.

13. A method of deploying an above-ground optical fiber cable installation, comprising:
deploying a length of optical fiber cable along an inner corner of curbing from an initial termination location to a final termination location; and
dispensing an adhesive overcoat material along the length of the optical fiber cable in an amount sufficient to encase the optical fiber cable and affix the optical fiber cable in position along the inner corner of curbing, the adhesive overcoat comprising a material that hardens upon curing.

14. The method of claim 13 wherein the length of optical fiber cable is deployed first, and the adhesive overcoat material is thereafter dispensed to cover the length of optical fiber cable.

15. The method of claim 13 wherein the adhesive coating material is dispensed first, and the length of optical cable is then deployed and pushed into the adhesive overcoat material so as to completely bury the length of optical cable in the dispensed adhesive coating material.

16. A method of deploying an above-ground optical fiber cable installation, comprising:
deploying a length of optical fiber cable along a predetermined above-ground pathway from an initial termination location to a final termination location;
dispensing an adhesive overcoat material along the length of the optical fiber cable in an amount sufficient to encase the optical fiber cable and affix the optical fiber cable in position along the pathway, the adhesive overcoat comprising a material that hardens upon curing;
deploying a drop cable upward along a pole to a pole-mounted drop device; and
dispensing an adhesive overcoat material over the drop cable to affix the drop cable to the pole and form a hardened protective shell covering for the drop cable.

* * * * *